United States Patent
Huang et al.

(10) Patent No.: US 8,354,828 B2
(45) Date of Patent: Jan. 15, 2013

(54) POWER SUPPLY WITH SYNCHRONIZED CLOCKS AND RELATED DC-DC CONVERTER

(75) Inventors: Wen-Hsiu Huang, Miaoli County (TW); Chih-Kuang Wu, Hsinchu (TW); De-Chin Lan, Kaohsiung County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 497 days.

(21) Appl. No.: 12/635,716

(22) Filed: Dec. 11, 2009

(65) Prior Publication Data

US 2011/0080755 A1 Apr. 7, 2011

(30) Foreign Application Priority Data

Oct. 5, 2009 (TW) .............................. 98133764 A

(51) Int. Cl.
*G05F 1/577* (2006.01)

(52) U.S. Cl. ........................... 323/267; 323/266; 307/31

(58) Field of Classification Search ................. 323/267, 323/266, 268, 271, 272; 307/31, 12, 13, 307/14, 16, 30

See application file for complete search history.

(56) References Cited

U.S. PATENT DOCUMENTS

| | | | | |
|---|---|---|---|---|
| 5,045,712 A | * | 9/1991 | Baggenstoss | 307/29 |
| 5,130,561 A | * | 7/1992 | Elliott et al. | 307/31 |
| 6,437,548 B2 | * | 8/2002 | Aas et al. | 323/272 |
| 7,373,527 B2 | * | 5/2008 | Chapuis | 713/300 |
| 7,456,617 B2 | * | 11/2008 | Chapuis et al. | 323/267 |
| 7,923,860 B2 | * | 4/2011 | Furuse et al. | 307/31 |
| 2003/0107355 A1 | * | 6/2003 | Saeki et al. | 323/282 |
| 2009/0195071 A1 | | 8/2009 | Furuse | |

FOREIGN PATENT DOCUMENTS

| | | |
|---|---|---|
| TW | I235541 | 7/2005 |
| TW | I255088 | 5/2006 |
| TW | 200807843 | 2/2008 |

\* cited by examiner

*Primary Examiner* — Harry Behm
(74) *Attorney, Agent, or Firm* — Winston Hsu; Scott Margo

(57) ABSTRACT

A power supply with synchronized clocks includes a transformer for transforming an AC input voltage into a DC input voltage, a delay unit for delaying phase of a standard clock signal to generate a plurality of synchronization clock signals, a major DC-DC converter for adjusting voltage level and phase of the DC input voltage according to one of the plurality of synchronization clock signals to generate a major output voltage, and a plurality of parallel DC-DC converters each for adjusting voltage level and phase of the major output voltage according to one of the plurality of synchronization clock signals to generate a minor output voltage.

26 Claims, 7 Drawing Sheets

POWER SUPPLY WITH SYNCHRONIZED CLOCKS AND RELATED DC-DC CONVERTER

BACKGROUND OF THE INVENTION

1. Field of the Invention

The present invention is related to a power supply and related DC-DC converter, and more particularly, to a power supply and related DC-DC converter capable of reducing ripples on output voltages of the power supply by synchronizing clocks of different DC-DC converters.

2. Description of the Prior Art

An electronic device usually includes various components requiring different operating voltages. In order to provide the operating voltages, a power supply includes multiple DC-DC (direct current) voltage converting circuits, such as a buck (step down) converter or boost (step up) converter, utilized for adjusting (step up or step down) voltage levels and stabilizing the adjusted voltages at specific default levels.

Please refer to FIG. 1, which is a schematic diagram of a power supply 10 of the prior art. The power supply 10 includes a rectifier 100, a front-stage DC-DC converter 102 and back-stage DC-DC converters 104, 106. The rectifier 100 converts an alternating current (AC) voltage VAC provided by an AC voltage source 108 into a direct current (DC) voltage VDC. The front-stage DC-DC converter 102 adjusts level of the DC voltage VDC to generate a major output voltage VOUT_M. The back-stage DC-DC converters 104, 106 respectively generate minor output voltages VOUT_m1, VOUT_m2 based on the major output voltage VOUT_M to provide different voltage levels. For example, if the power supply 10 is a power supply conforming to an ATX (Advanced Technology Extended) power standard, the rectifier 100 converts an 110V AC household voltage into an 110V DC voltage. Next, the front-stage DC-DC converter 102 converts the 110V DC voltage into a 12V DC voltage. Finally, the back-stage DC-DC converters 104, 106 respectively convert the 12V DC voltage into 5V and 3.3V DC voltages. As a result, 12V, 5V or 3.3V can be applied to electronic components based upon specific power requirements.

In general, the front-stage DC-DC converter 102 and the back-stage DC-DC converters 104, 106 are switching DC-DC converters. That is, the front-stage DC-DC converter 102 and the back-stage DC-DC converters 104, 106 generate sawtooth wave signals by oscillators to indicate switching timing of a charging/discharging path. In other words, the front-stage DC-DC converter 102 and the back-stage DC-DC converters 104, 106 generate various output voltage levels by adjusting a duty cycle of the charging/discharging path.

However, due to undesired factors like manufacturing process defects, physical properties of materials, etc., parasitic components naturally exist in the power supply 10, and lead to coupling effects between the output voltages VOUT_M, VOUT_m1, VOUT_m2 with undesired ripples, as illustrated in FIG. 2. The ATX power standard defines tolerance of amplitudes of ripples within a small range. That is, if the power supply 10 cannot effectively attenuate the ripples, related product yield drops dramatically. For that reason, the power supply 10 is installed with filters at output ends to reduce amplitudes of the ripples. However, extra hardware implies extra cost.

Therefore, reduction of ripples on output voltages of a power supply has been a major focus of the industry.

SUMMARY OF THE INVENTION

It is therefore a primary objective of the claimed invention to provide a power supply with synchronized clocks and related DC-DC Converter.

The present invention discloses a DC-DC converter for reducing ripples on an output voltage of a power supply. The DC-DC converter comprises an input end for receiving a direct current (DC) voltage of the power supply, an output end for outputting the output voltage, a feedback module coupled to the output end for generating a feedback signal according to the output voltage, a switch module comprising a front end for receiving a pulse width modulation (PWM) signal, a back end, an up-bridge switch transistor coupled to the input end, the front end and the back end for determining whether or not the input end is electrically connected to the back end according to the PWM signal, and a down-bridge switch transistor coupled to the front end, the back end and a ground end for determining whether or not the back end is electrically connected to the ground end according to an inverted signal of the PWM signal, an output module comprising an output inductor comprising one end coupled to the back end of the switch module and another end coupled to the output end, and an output capacitor comprising one end coupled between the output inductor and the output end and another end coupled to the ground end, an oscillator for generating a sawtooth wave signal, a first comparator coupled to the feedback module for comparing a first reference signal and the feedback signal to generate a comparison result, a second comparator coupled to the first comparator the front end of the switch module and the oscillator for comparing the comparison result and the sawtooth wave signal to generate the PWM signal sent to the switch module, and a synchronizer coupled to the second comparator and the switch module for adjusting phase of the PWM signal according to a synchronization clock signal.

The present invention further discloses a power supply which comprises a rectifier for converting an alternating current (AC) voltage into a direct current (DC) voltage, a delay unit for delaying a phase of a standard clock signal to generate a plurality of synchronization clock signals, a major DC-DC converter coupled to the rectifier and the delay unit for adjusting level and phase of the DC voltage according to one of the plurality of synchronization clock signals to generate a major output voltage, and a plurality of parallel DC-DC converters, each coupled to the major DC-DC converter and the delay unit for adjusting level and phase of the major output voltage according to one of the plurality of synchronization clock signals to generate a minor output voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
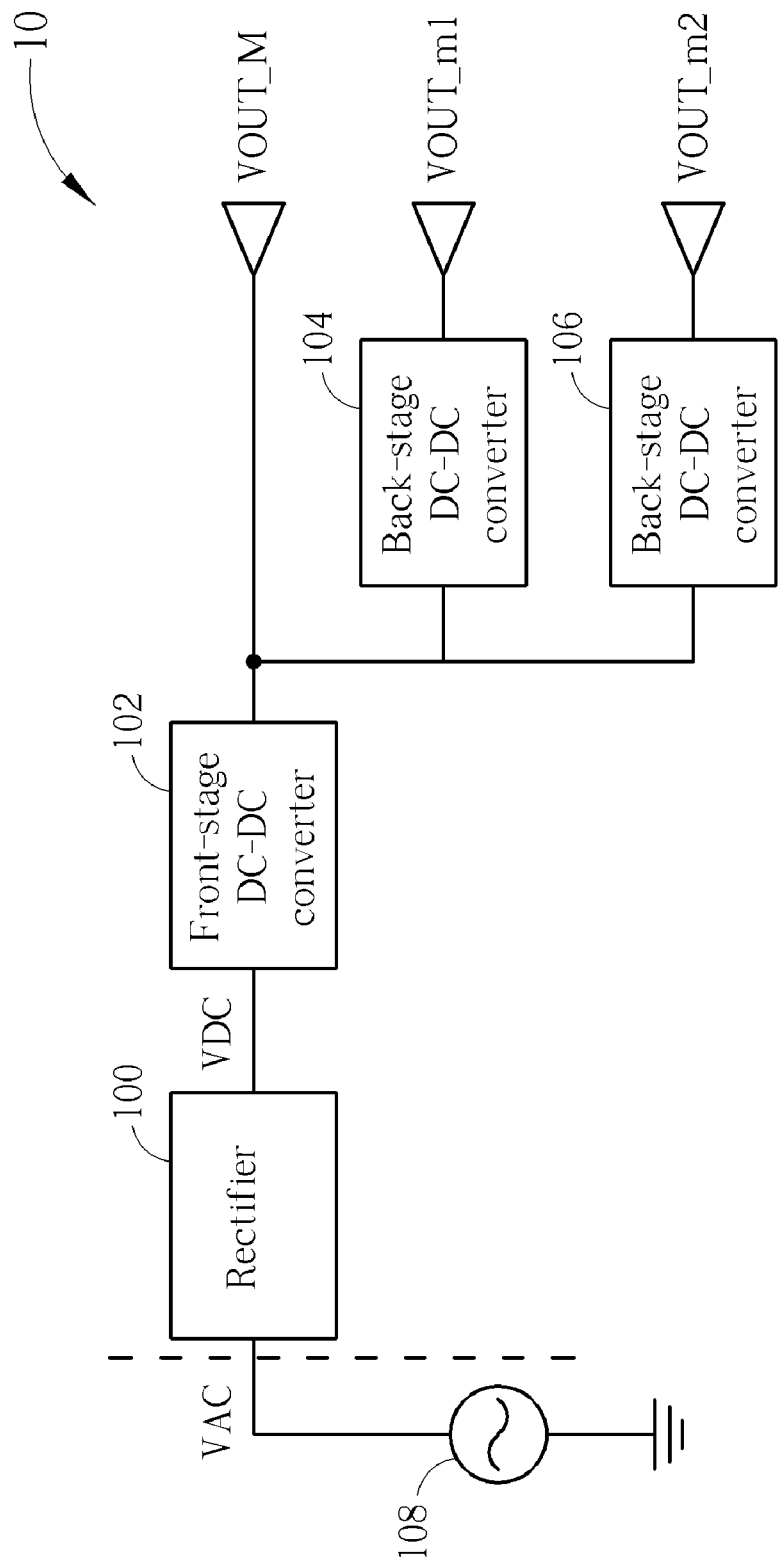
FIG. 1 is a schematic diagram of a power supply of the prior art.
Figure 2:
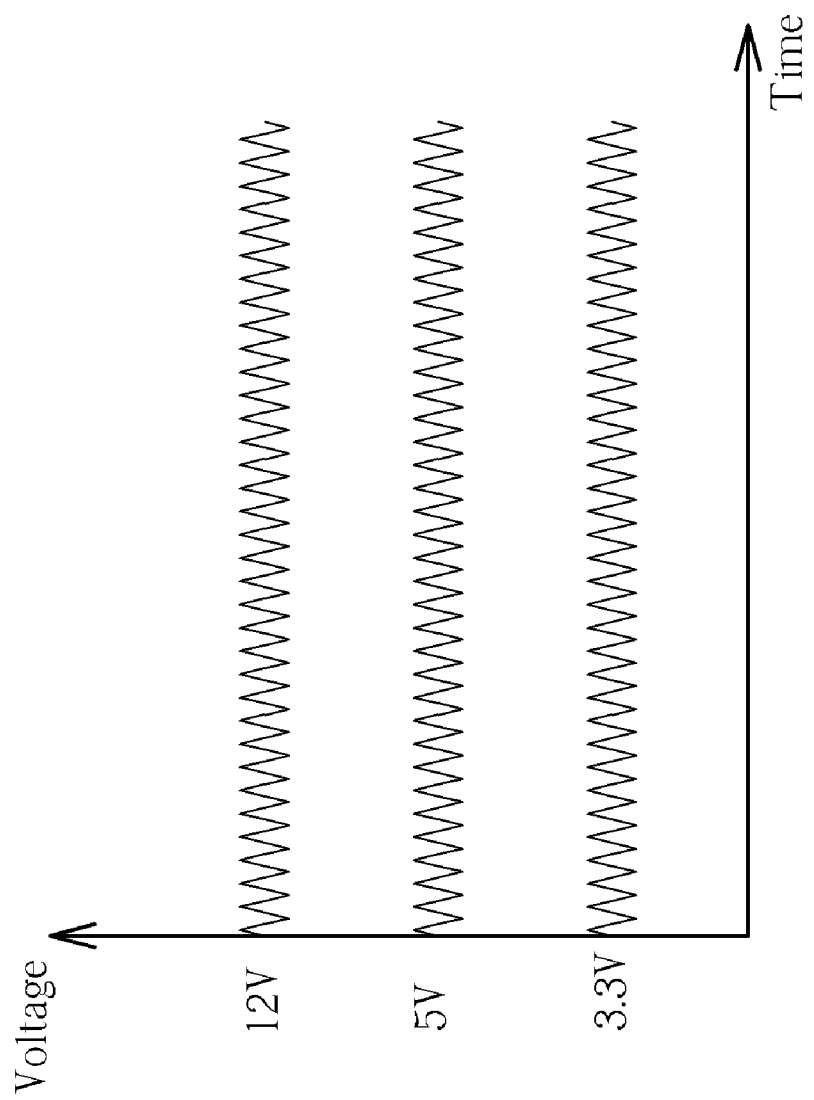
FIG. 2 is a time-variant schematic diagram of output voltages of the power supply shown in FIG. 1.
Figure 3:
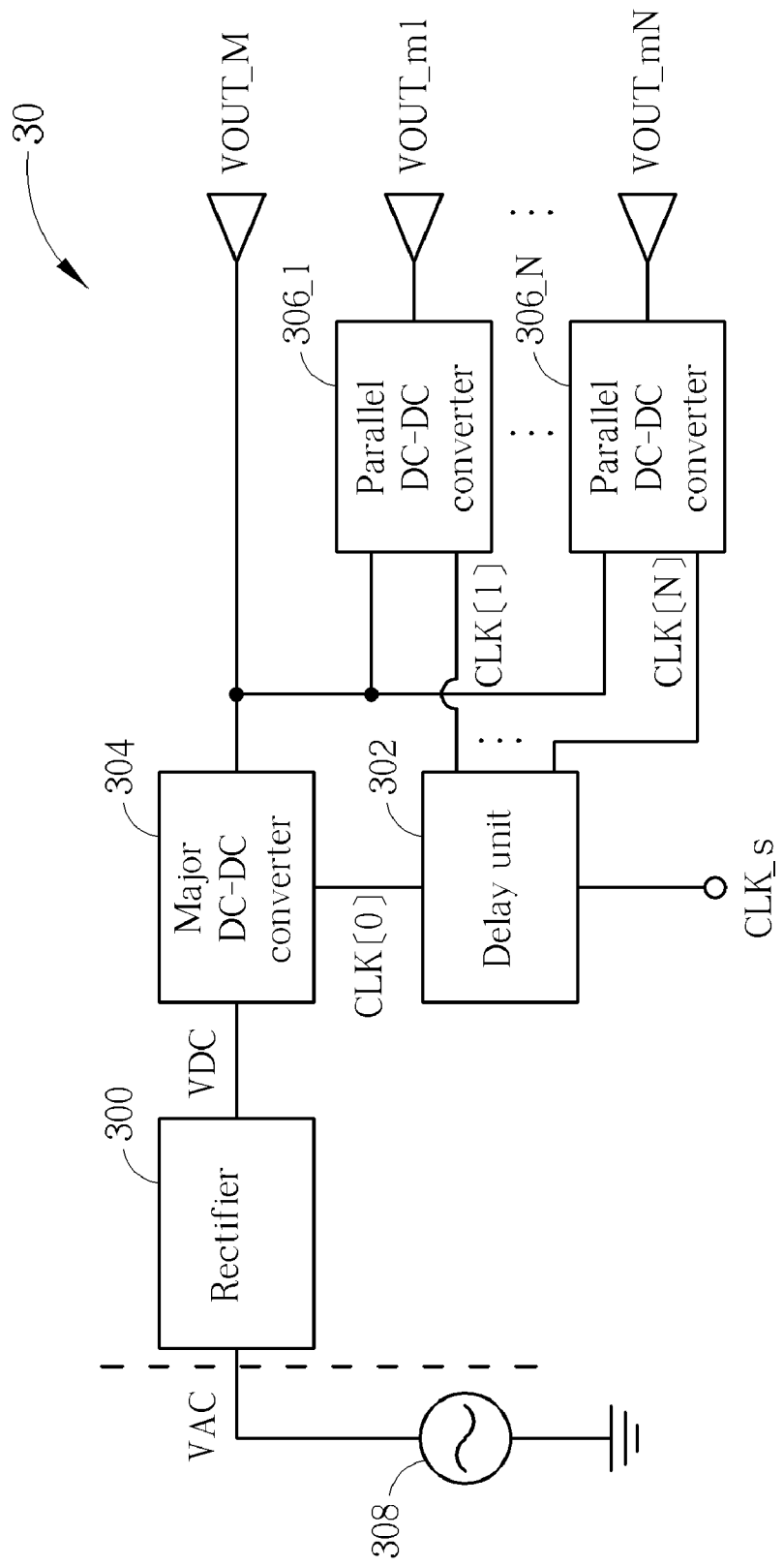
FIG. 3 is a schematic diagram of a power supply according to an embodiment of the present invention.

Please refer to FIG. 3, which is a schematic diagram of a power supply 30 according to an embodiment of the present invention. The power supply 30 includes a rectifier 300, a delay unit 302, a major DC-DC (direct current) converter 304 and parallel DC-DC converters 306_1-306_N. The rectifier 300 is utilized for converting an alternating current (AC) voltage VAC provided by an AC voltage source 308, such as a household voltage source, into a DC voltage VDC. The delay unit 302 is utilized for delaying phase of a standard clock signal CLK_s to generate synchronization clock signals CLK[0]-CLK[N]. The major DC-DC converter 304 is utilized for adjusting level and phase of the DC voltage VDC according to the synchronization clock signal CLK[0] to generate a major output voltage VOUT_M. Similarly, the parallel DC-DC converters 306_1-306_N adjust level and phase of the major output voltage according to the corresponding synchronization clock signals CLK[1]-CLK[N] to respectively generate minor output voltages VOUT_m1-VOUT_mN.

In short, the power supply 30 synchronizes phases of operating clocks of the major DC-DC converter 304 and the parallel DC-DC converters 306_1-306_N based on the standard clock signal CLK_s to reduce ripples on the output voltages VOUT_M, VOUT_m1-VOUT_mN. Since frequencies of operating clocks of the major DC-DC converter 304 and the parallel DC-DC converters 306_1-306_N are preferably the same or a multiple of each other, synchronizing the phases of the operating clocks can reduce interference (coupling) among the output voltages VOUT_M, VOUT_m1-VOUT_mN, so as to reduce amplitudes of the ripples.

In order to synchronize the phases of the operating clocks, the delay unit 302 delays the standard clock signal CLK_s, such that phase differences between the synchronization clock signals CLK[0]-CLK[N] are 0 or 180 degrees. Since the synchronization clock signals CLK[0]-CLK[N] are periodic signals, ripples induced by coupling effects can be minimized with the phase differences of 0 or 180 degrees. Certainly, in addition to the phase differences of 0 and 180 degrees, those skilled in the art can set the desired phase differences based upon signal type, signal period, etc.

Figure 4:
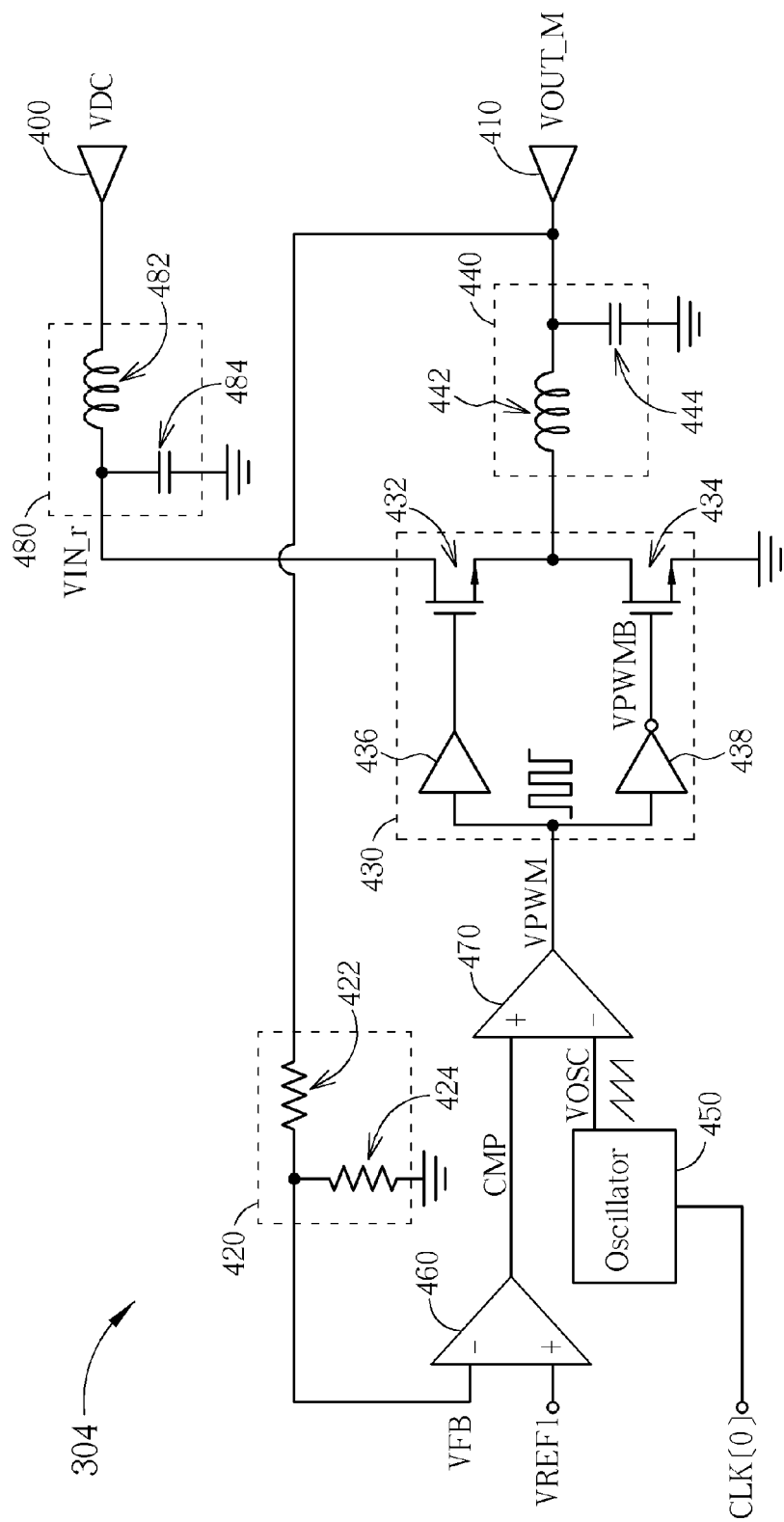
FIG. 4 is a schematic diagram of a major DC-DC converter of the power supply shown in FIG. 3.

In detail, please refer to FIG. 4, which is a schematic diagram of the major DC-DC converter 304. The major DC-DC converter 304 includes an input end 400, an output end 410, a feedback module 420, a switch module 430, an output module 440, an oscillator 450, a first comparator 460, a second comparator 470 and an input module 480. The input end 400 is utilized for receiving the DC voltage VDC. The input module 480 includes an input inductor 482 and an input capacitor 484, and is utilized for performing lowpass filtering on the DC voltage VDC to generate an intermediate input voltage VIN_r. The output end 410 is utilized for outputting the major output voltage VOUT_M. The feedback module 420 is utilized for generating a feedback signal VFB according to the major output voltage VOUT_M. The switch module 430 includes an up-bridge switch transistor 432, a down-bridge switch transistor 434, an amplifier 436 and an inverter 438. The amplifier 436 is utilized for amplifying a pulse width modulation (PWM) signal VPWM. The inverter 438 is utilized for amplifying the PWM signal VPWM and generating an inverted signal VPWMB of the PWM signal VPWM. The up-bridge switch transistor 432 is utilized for determining whether or not the input end 400 is electrically connected to the output module 440 according to the PWM signal. Similarly, the down-bridge switch transistor 434 is utilized for determining whether or not the output module 440 is electrically connected to a ground end GND according to the inverted signal VPWMB. The output module 440 includes an output inductor 442 and an output capacitor 444, and is utilized for generating the major output voltage VOUT_M. The oscillator 450 is utilized for adjusting phase of a sawtooth wave signal VOSC according to the synchronization clock signal CLK[0]. The first comparator 460 is utilized for comparing a first reference signal VREF1 and the feedback signal VFB to generate a comparison result CMP. The second comparator 470 is utilized for comparing the comparison result CMP and the sawtooth wave signal VOSC to generate the PWM signal VPWM, so as to determine whether or not to enable the switch module 430.

In short, the major DC-DC converter 30 generates the sawtooth wave signal VOSC with phase synchronized to the synchronization clock signal CLK[0] to determine whether or not to enable the switch module 430, so as to reduce amplitude of the ripples on the output voltage VOUT_M.

Figure 5A:
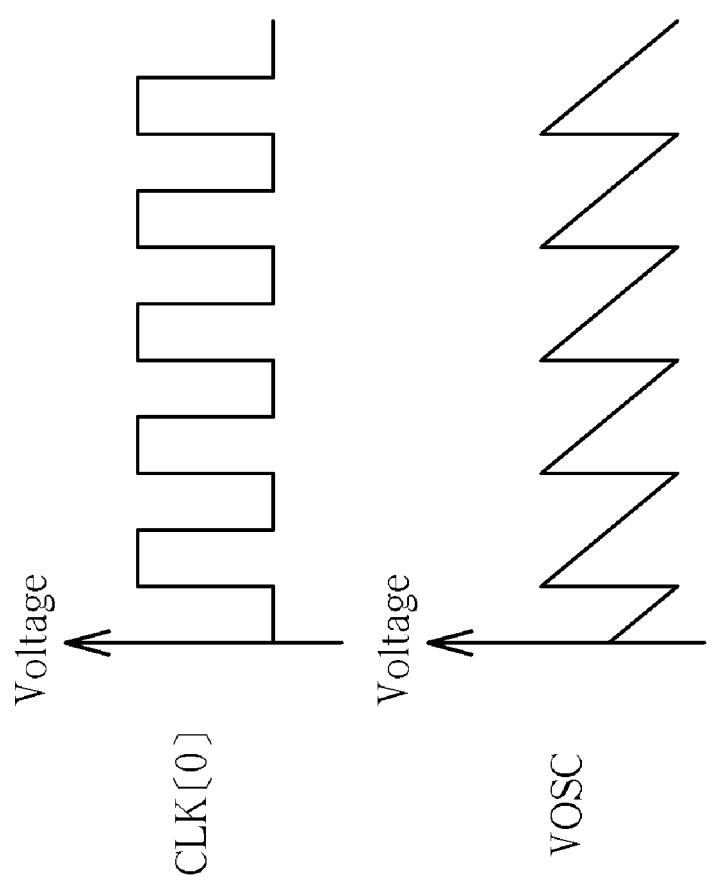
FIG. 5A and FIG. 5B are time-variant schematic diagrams of a synchronization clock signal and a sawtooth wave signal of the major DC-DC converter shown in FIG. 4.
Figure 5B:
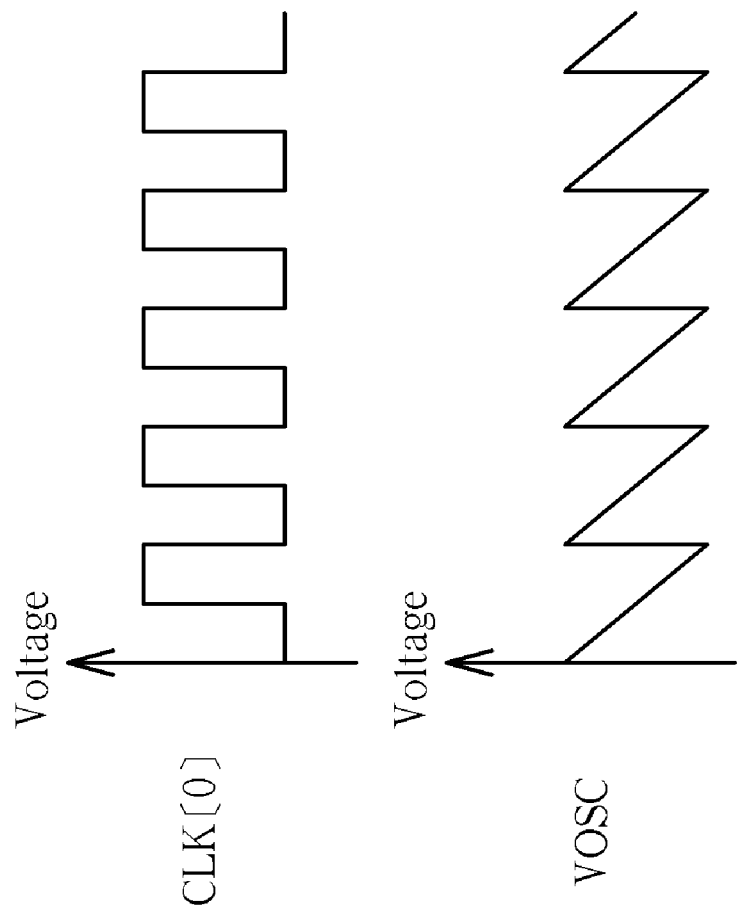

For example, when the synchronization clock signal CLK[0] is switched from a low potential state VL to a high potential state VH, the oscillator 450 can dramatically increase the sawtooth wave signal VOSC to a peak state, as illustrated in FIG. 5A. As a result, the phase difference between the sawtooth wave signal VOSC and the synchronization clock signal CLK[0] is 0 degrees. Certainly, the oscillator 450 can alternatively decrease the sawtooth wave signal VOSC to the peak state when the synchronization clock signal CLK[0] is switched from the high potential state VH to the low potential state VL, as illustrated in FIG. 5B. In this case, the phase difference between the sawtooth wave signal VOSC and the synchronization clock signal CLK[0] is 180 degrees, functioning the same as 0 degrees in ripple reduction.

In addition, the feedback module 420 preferably includes a first resistor 422 and a second resistor 424, and is utilized for generating a divided voltage of the major output voltage VOUT_M to be the feedback signal VFB.

Preferably, the parallel DC-DC converters 306_1-306_N have the same architecture as the major DC-DC converter 304 except for external connections. More specifically, input ends of the parallel DC-DC converters 306_1-306_N are utilized for receiving the major output voltage VOUT_M, output ends of the parallel DC-DC converters 306_1-306_N are respectively utilized for outputting the minor output voltages VOUT_m1-VOUT_mN, and the parallel DC-DC converters 306_1-306_N respectively synchronize phases of operating clocks (VPWM) thereof based upon the synchronization clock signals CLK[1]-CLK[N]. Thus, architecture and operations of the parallel DC-DC converters 306_1-306_N can be referred from the above, and are not further narrated herein.

Figure 6:
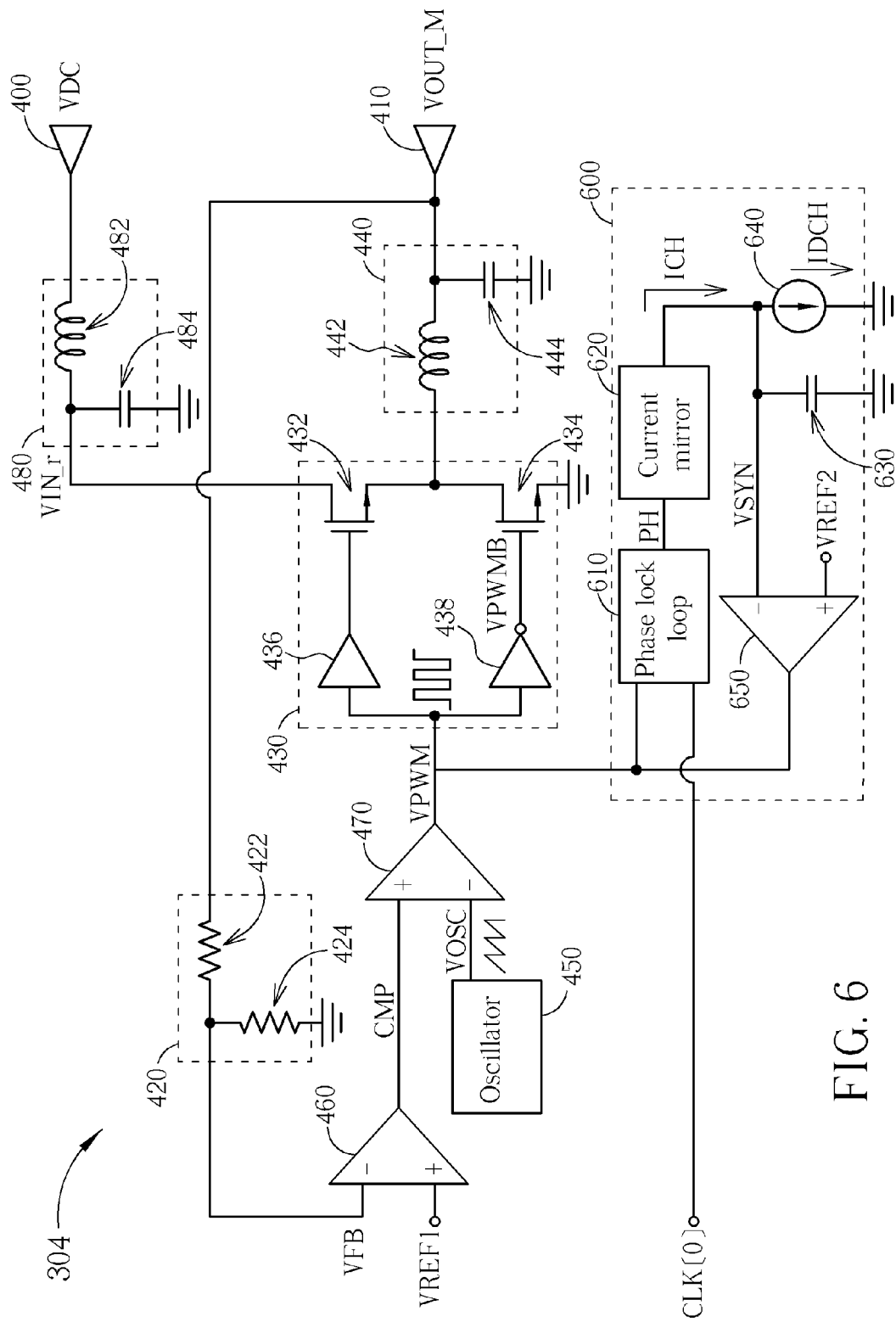
FIG. 6 is a schematic diagram of an alternative embodiment of the major DC-DC converter of the power supply shown in FIG. 3.

In addition to the architecture illustrated in FIG. 4, please refer to FIG. 6, which is a schematic diagram of an alternative embodiment of the major DC-DC converter 304. In FIG. 6, other than the units and modules already shown in FIG. 4, the major DC-DC converter 304 further includes a synchronizer 600 utilized for adjusting phase of the PWM signal VPWM according to the synchronization clock signal CLK[0]. Note that, the oscillator 450 in FIG. 6 no longer adjusts the phase of the sawtooth wave signal VOSC based upon the synchronization clock signal CLK[0], but functions independently.

In detail, the synchronizer 600 includes a phase lock loop 610, a current mirror 620, a synchronization capacitor 630, a discharger current source 640 and a synchronization comparator 650. The phase lock loop 610 is utilized for generating a phase signal PH according to the synchronization clock signal CLK[0]. The current mirror 620 is utilized for generating a charging current ICH according to the phase signal PH. The synchronization capacitor 630 is utilized for receiving the charging current ICH to generate a synchronization voltage VSYN. The discharger current source 640 is utilized for drawing a discharging current IDCH from the synchronization capacitor 630. Finally, the synchronization comparator 650 compares the synchronization voltage VSYN and a second reference signal VREF2 to synchronize phases of the PWM signal VPWM and the synchronization clock signal VSYN.

In short, the phase lock loop 610, the current mirror 620, the synchronization capacitor 630, the discharger current source 640 and the synchronization comparator 650 form a closed loop circuit in the synchronizer 600, and can lock the phase of the PWM signal VPWM to the phase of the synchronization clock signal CLK[0], so as to reduce the amplitudes of the ripples on the major output voltage VOUT_M by synchronization.

Certainly, the parallel DC-DC converters 306_1-306_N can be implemented in accordance with the architecture shown in FIG. 6. To do so, the input end 400 receives the major output voltage VOUT_M, the output end 440 outputs the corresponding minor output voltage VOUT_mx, and the synchronizer 600 adjusts the phase of the PWN signal VPWM based upon the corresponding synchronization clock signal CLK[x]. In addition to these modifications, related operations remain the same as the major DC-DC converter 304 shown in FIG. 6, and are not further narrated herein.

Regardless of the architecture, shown in FIG. 4 or in FIG. 6, applied to the DC-DC converters 304, 306_1-306_N, the phase difference between the PWM signal VPWM and the standard clock signal CLK_s is 0 or 180 degrees as long as the PWM signal VPWM is synchronized with the corresponding synchronization clock signals CLK[0]-CLK[N]. As a result, phase differences among the output voltages VOUT_M, VOUT_m1-VOUT_mN are 0 or 180 degrees as well, and therefore interferences thereof can be reduced.

In the prior art, since oscillators in the front-stage DC-DC converter 102 and the back-stage DC-DC converters 104, 106 function independently, phases of the output voltages VOUT_M, VOUT_m1, VOUT_m2 of the power supply 10 cannot be synchronized. As a result, amplitudes of the ripples on the output voltages VOUT_M, VOUT_m1, VOUT_m2 cannot be reduced by synchronization. For that reason, the power supply 10 is installed with extra filters to minimize the amplitudes on the ripples, so as to conform to power standards such as ATX. In comparison, according to the present invention, the phases of the PWM signals VPWM in the DC-DC converters 304, 306_1-306_N are synchronized in accordance with the standard clock signal CLK_s to reduce the amplitudes of ripples on the output voltages VOUT_M, VOUT_m1-VOUT_mN, so as to conform to power standards such as ATX. As a result, the filters are no longer required for the power supply 30, implying a reduced manufacturing cost as well as a simpler, more stable design and production process, and greater efficiency of power supplying.

To sum up, the present invention reduces the ripples on output voltages of the DC-DC converter by synchronizing clocks of different DC-DC converters to conform to specifications required by power standards, such that the filters previously installed in the input and output ends of the DC-DC converters can be eliminated, so as to reduce manufacturing costs and achieve a simpler and more stable design and production process and enhanced efficiency of power supplying.

Those skilled in the art will readily observe that numerous modifications and alterations of the device and method may be made while retaining the teachings of the invention.

What is claimed is:

1. A power supply comprising:
    a rectifier, for converting an alternating current (AC) voltage into a direct current (DC) voltage;
    a delay unit, for delaying phase of a standard clock signal to generate a plurality of synchronization clock signals;
    a major DC-DC converter, coupled to the rectifier and the delay unit, for adjusting level and phase of the DC voltage according to one of the plurality of synchronization clock signals to generate a major output voltage; and
    a plurality of parallel DC-DC converters, each coupled to the major DC-DC converter and the delay unit, for adjusting level and phase of the major output voltage according to one of the plurality of synchronization clock signals to generate a minor output voltage;
    wherein each of the plurality of parallel DC-DC converters comprises:
    an input end, for receiving the major output voltage;
    an output end, for outputting the minor output voltage;
    a feedback module, coupled to the output end, for generating a feedback signal according to the minor output voltage;
    a switch module comprising:
        a front end, for receiving a pulse width modulation (PWM) signal;
        a back end;
        an up-bridge switch transistor, coupled to the input end, the front end and the back end, for determining whether or not the input end is electrically connected to the back end according to the PWM signal; and
        a down-bridge switch transistor, coupled to the front end, the back end and a ground end, for determining whether or not the back end is electrically connected to the ground end according to an inverted signal of the PWM signal;
    an output module comprising:
        an output inductor, comprising one end coupled to the back end of the switch module and another end coupled to the output end; and
        an output capacitor, comprising one end coupled between the output inductor and the output end and another end coupled to the ground end;
    an oscillator, for generating a sawtooth wave signal;
    a first comparator, coupled to the feedback module, for comparing a first reference signal and the feedback signal to generate a comparison result;
    a second comparator, coupled to the first comparator, the oscillator and the front end of the switch module, for comparing the comparison result and the sawtooth wave signal to generate the PWM signal sent to the switch module; and
    a synchronizer, coupled to the second comparator, the front end of the switch module and the delay unit, for adjusting a phase of the PWM signal according to one of the plurality of synchronization clock signals.

2. The power supply of claim 1, wherein phase differences between the plurality of synchronization clock signals are 0 or 180 degrees.

3. The power supply of claim 1, wherein the major DC-DC converter comprises:
    an input end, for receiving the DC voltage;
    an output end, for outputting the major output voltage;
    a feedback module, coupled to the output end, for generating a feedback signal according to the major output voltage;
    a switch module comprising:
        a front end, for receiving a pulse width modulation (PWM) signal;
        a back end;
        an up-bridge switch transistor, coupled to the input end, the front end and the back end, for determining whether or not the input end is electrically connected to the back end according to the PWM signal; and a down-bridge switch transistor, coupled to the front end, the back end and a ground end, for determining whether or not the back end is electrically connected to the ground end according to an inverted signal of the PWM signal;

an output module comprising:
  an output inductor, comprising one end coupled to the back end of the switch module and another end coupled to the output end; and
  an output capacitor, comprising one end coupled between the output inductor and the output end and another end coupled to the ground end;

an oscillator, coupled to the delay unit, for adjusting a phase of a sawtooth wave signal according to one of the plurality of synchronization clock signals;

a first comparator, coupled to the feedback module, for comparing a first reference signal and the feedback signal to generate a comparison result; and a second comparator, coupled to the first comparator, the front end of the switch module and the oscillator, for comparing the comparison result and the sawtooth wave signal to generate the PWM signal sent to the switch module.

4. The power supply of claim 3, wherein the oscillator adjusts the phase of the sawtooth wave signal to be equal to a phase of the synchronization clock signal.

5. The power supply of claim 3, wherein the oscillator adjusts the phase of the sawtooth wave signal to be different from a phase of the synchronization clock signal by a margin of 180 degrees.

6. The power supply of claim 3, wherein the major DC-DC converter further comprises:
  an input inductor, comprising one end coupled to the input end and another end coupled to the up-bridge switch transistor; and
  an input capacitor, comprising one end coupled between the input inductor and the up-bridge switch transistor and another end coupled to the ground end.

7. The power supply of claim 3, wherein the switch module further comprises:
  an amplifier, coupled between the front end and the up-bridge switch transistor, for amplifying the PWM signal; and
  an inverter, coupled between the front end and the down-bridge switch transistor, for amplifying the PWM signal and generating the inverted signal of the PWM signal.

8. The power supply of claim 3, wherein the feedback module comprises:
  a first resistor, comprising one end coupled to the output end, and another end coupled to the first comparator; and
  a second resistor, comprising one end coupled between the first resistor and the first comparator, and another end coupled to the ground end.

9. The power supply of claim 6, wherein the oscillator adjusts the phase of the sawtooth wave signal to be equal to a phase of the synchronization clock signal.

10. The power supply of claim 6, wherein the oscillator adjusts the phase of the sawtooth wave signal to be different from a phase of the synchronization clock signal by a margin of 180 degrees.

11. The power supply of claim 6, wherein the parallel DC-DC converter further comprises:
  an input inductor, comprising one end coupled to the input end and another end coupled to the up-bridge switch transistor; and
  an input capacitor, comprising one end coupled between the input inductor and the up-bridge switch transistor and another end coupled to the ground end.

12. The power supply of claim 1, wherein the major DC-DC converter comprises:
  an input end, for receiving the DC voltage;
  an output end, for outputting the major output voltage;
  a feedback module, coupled to the output end, for generating a feedback signal according to the major output voltage;
  a switch module comprising:
    a front end, for receiving a pulse width modulation (PWM) signal;
    a back end;
    an up-bridge switch transistor, coupled to the input end, the front end and the back end, for determining whether or not the input end is electrically connected to the back end according to the PWM signal; and
    a down-bridge switch transistor, coupled to the front end, the back end and a ground end, for determining whether or not the back end is electrically connected to the ground end according to an inverted signal of the PWM signal;
  an output module comprising:
    an output inductor, comprising one end coupled to the back end and another end coupled to the output end; and
    an output capacitor, comprising one end coupled between the output inductor and the output end and another end coupled to the ground end;
  an oscillator, for generating a sawtooth wave signal;
  a first comparator, coupled to the feedback module, for comparing a first reference signal and the feedback signal to generate a comparison result;
  a second comparator, coupled to the first comparator, the oscillator and the front end of the switch module, for comparing the comparison result and the sawtooth wave signal to generate the PWM signal sent to the switch module; and
  a synchronizer, coupled to the second comparator, the front end of the switch module and the delay unit, for adjusting phase of the PWM signal according to one of the plurality of synchronization clock signals.

13. The power supply of claim 12, wherein the synchronizer comprises:
  a phase lock loop, coupled to the front end and the delay unit, for generating a phase signal according to the synchronization clock signal;
  a current mirror, coupled to the phase lock loop, for generating a charging current according to the phase signal;
  a synchronization capacitor, comprising one end coupled to the current mirror and another end coupled to the ground end, for generating a synchronization voltage;
  a discharger current source, coupled to the synchronization capacitor and the current mirror, for drawing a discharging current from the synchronization capacitor; and
  a synchronization comparator, coupled to the current mirror, the synchronization capacitor, the discharger current source, the phase lock loop and the front end, for comparing the synchronization voltage and a second reference signal to synchronize phases of the PWM signal and the synchronization clock signal.

14. The power supply of claim 12, wherein the major DC-DC converter further comprises:
  an input inductor, comprising one end coupled to the input end and another end coupled to the up-bridge switch transistor; and an input capacitor, comprising one end coupled between the input inductor and the up-bridge switch transistor and another end coupled to the ground end.

15. The power supply of claim 12, wherein the switch module further comprises:
an amplifier, coupled between the front end and the up-bridge switch transistor, for amplifying the PWM signal; and
an inverter, coupled between the front end and the down-bridge switch transistor, for amplifying the PWM signal and generating the inverted signal of the PWM signal.

16. The power supply of claim 12, wherein the feedback module comprises:
a first resistor, comprising one end coupled to the output end and another end coupled to the first comparator; and
a second resistor, comprising one end coupled between the first resistor and the first comparator and another end coupled to the ground end.

17. The power supply of claim 1, wherein the synchronizer comprises:
a phase lock loop, coupled to the front end and the delay unit, for generating a phase signal according to the synchronization clock signal;
a current mirror, coupled to the phase lock loop, for generating a charging current according to the phase signal;
a synchronization capacitor, comprising one end coupled to the current mirror and another end coupled to the ground end, for generating a synchronization voltage;
a discharger current source, coupled to the synchronization capacitor and the current mirror, for drawing a discharging current from the synchronization capacitor; and
a synchronization comparator, coupled to the current mirror, the synchronization capacitor, the discharger current source, the phase lock loop and the front end, for comparing the synchronization voltage and a second reference signal to synchronize phases of the PWM signal and the synchronization clock signal.

18. The power supply of claim 1, wherein the major DC-DC converter further comprises:
an input inductor, comprising one end coupled to the input end and another end coupled to the up-bridge switch transistor; and
an input capacitor, comprising one end coupled between the input inductor and the up-bridge switch transistor and another end coupled to the ground end.

19. The power supply of claim 1, wherein the switch module further comprises:
an amplifier, coupled between the front end and the up-bridge switch transistor, for amplifying the PWM signal; and
an inverter, coupled between the front end and the down-bridge switch transistor, for amplifying the PWM signal and generating the inverted signal of the PWM signal.

20. The power supply of claim 1, wherein the feedback module comprises:
a first resistor, comprising one end coupled to the output end and another end coupled to the first comparator; and
a second resistor, comprising one end coupled between the first resistor and the first comparator and another end coupled to the ground end.

21. A power supply comprising:
a rectifier, for converting an alternating current (AC) voltage into a direct current (DC) voltage;
a delay unit, for delaying phase of a standard clock signal to generate a plurality of synchronization clock signals;
a major DC-DC converter, coupled to the rectifier and the delay unit, for adjusting level and phase of the DC voltage according to one of the plurality of synchronization clock signals to generate a major output voltage; and
a plurality of parallel DC-DC converters, each coupled to the major DC-DC converter and the delay unit, for adjusting level and phase of the major output voltage according to one of the plurality of synchronization clock signals to generate a minor output voltage;
wherein the major DC-DC converter comprises:
an input end, for receiving the DC voltage;
an output end, for outputting the major output voltage;
a feedback module, coupled to the output end, for generating a feedback signal according to the major output voltage;
a switch module comprising:
a front end, for receiving a pulse width modulation (PWM) signal;
a back end;
an up-bridge switch transistor, coupled to the input end, the front end and the back end, for determining whether or not the input end is electrically connected to the back end according to the PWM signal; and
a down-bridge switch transistor, coupled to the front end, the back end and a ground end, for determining whether or not the back end is electrically connected to the ground end according to an inverted signal of the PWM signal;
an output module comprising:
an output inductor, comprising one end coupled to the back end and another end coupled to the output end; and
an output capacitor, comprising one end coupled between the output inductor and the output end and another end coupled to the ground end;
an oscillator, for generating a sawtooth wave signal;
a first comparator, coupled to the feedback module, for comparing a first reference signal and the feedback signal to generate a comparison result;
a second comparator, coupled to the first comparator, the oscillator and the front end of the switch module, for comparing the comparison result and the sawtooth wave signal to generate the PWM signal sent to the switch module; and
a synchronizer, coupled to the second comparator, the front end of the switch module and the delay unit, for adjusting phase of the PWM signal according to one of the plurality of synchronization clock signals.

22. The power supply of claim 21, wherein phase differences between the plurality of synchronization clock signals are 0 or 180 degrees.

23. The power supply of claim 21, wherein the synchronizer comprises:
a phase lock loop, coupled to the front end and the delay unit, for generating a phase signal according to the synchronization clock signal;
a current mirror, coupled to the phase lock loop, for generating a charging current according to the phase signal;
a synchronization capacitor, comprising one end coupled to the current mirror and another end coupled to the ground end, for generating a synchronization voltage;
a discharger current source, coupled to the synchronization capacitor and the current mirror, for drawing a discharging current from the synchronization capacitor; and
a synchronization comparator, coupled to the current mirror, the synchronization capacitor, the discharger current source, the phase lock loop and the front end, for comparing the synchronization voltage and a second reference signal to synchronize phases of the PWM signal and the synchronization clock signal.

24. The power supply of claim 21, wherein the major DC-DC converter further comprises:
   an input inductor, comprising one end coupled to the input end and another end coupled to the up-bridge switch transistor; and
   an input capacitor, comprising one end coupled between the input inductor and the up-bridge switch transistor and another end coupled to the ground end.

25. The power supply of claim 21, wherein the switch module further comprises:
   an amplifier, coupled between the front end and the up-bridge switch transistor, for amplifying the PWM signal; and
   an inverter, coupled between the front end and the down-bridge switch transistor, for amplifying the PWM signal and generating the inverted signal of the PWM signal.

26. The power supply of claim 21, wherein the feedback module comprises:
   a first resistor, comprising one end coupled to the output end and another end coupled to the first comparator; and
   a second resistor, comprising one end coupled between the first resistor and the first comparator and another end coupled to the ground end.

* * * * *